US012519783B2

(12) United States Patent
Bajaj et al.

(10) Patent No.: US 12,519,783 B2
(45) Date of Patent: Jan. 6, 2026

(54) DISTRIBUTED FACIAL RECOGNITION, REGISTRATION, AND AUTHENTICATION

(71) Applicant: Swiftlane, Inc., San Francisco, CA (US)

(72) Inventors: Saurabh Bajaj, San Francisco, CA (US); Ali Raza, Islamabad (PK); Nagesh Bhad, Solapur (IN)

(73) Assignee: Swiftlane, Inc., San Francisco, CA (US)

( * ) Notice: Subject to any disclaimer, the term of this patent is extended or adjusted under 35 U.S.C. 154(b) by 281 days.

(21) Appl. No.: 18/143,519

(22) Filed: May 4, 2023

(65) Prior Publication Data

US 2023/0362157 A1    Nov. 9, 2023

Related U.S. Application Data

(60) Provisional application No. 63/338,054, filed on May 4, 2022.

(51) Int. Cl.
*H04L 9/40*       (2022.01)
*G06N 3/045*      (2023.01)
*G06N 3/084*      (2023.01)

(52) U.S. Cl.
CPC ......... *H04L 63/0861* (2013.01); *G06N 3/084* (2013.01); *H04L 63/102* (2013.01); *H04L 63/104* (2013.01)

(58) Field of Classification Search
CPC . H04L 63/0861; H04L 63/102; H04L 63/104; G06N 3/084; G06N 3/045
See application file for complete search history.

(56) References Cited

U.S. PATENT DOCUMENTS

| | | | | |
|---|---|---|---|---|
| 10,157,323 B2* | 12/2018 | Alon | .................... | G06V 40/45 |
| 10,210,380 B2* | 2/2019 | Lonita | ................. | G06V 40/166 |
| 2017/0185760 A1* | 6/2017 | Wilder | ................... | G06F 21/32 |
| 2018/0060680 A1* | 3/2018 | Alon | ....................... | G06F 21/32 |
| 2019/0080155 A1* | 3/2019 | Ganong | .............. | G06V 40/167 |
| 2019/0213314 A1* | 7/2019 | Gordon | .................. | G06F 21/32 |
| 2022/0075997 A1* | 3/2022 | Vardimon | ........... | G06V 10/761 |
| 2022/0122356 A1* | 4/2022 | Ton-That | ............. | G06V 40/45 |

* cited by examiner

*Primary Examiner* — Aftab N. Khan
(74) *Attorney, Agent, or Firm* — LeonardPatel PC; Michael A. Leonard, II; Sheetal S. Patel

(57) ABSTRACT

Facilitating secure and updated user profile information within a distributed network for facial recognition-based access control systems is disclosed. A user's signature (e.g., facial profile data) is routinely and consistently updated across the access control platform. A remote computing system maintains timely and accurate signature data between user devices and access control devices such that each device benefits from the most updated user information, facial recognition models, and spoof detection models. A user may enroll or disenroll in the access control platform via his or her own mobile device, a cloud-based server, and/or the access control device. The enrollment or disenrollment data may be automatically synchronized and updated throughout the platform. These and other benefits may improve the ease with which users and access controllers (e.g., building owners, landlords, etc.) can securely and automatically enroll/disenroll users, thereby improving the uptake and prevalence of facial recognition-based access control platforms.

18 Claims, 11 Drawing Sheets

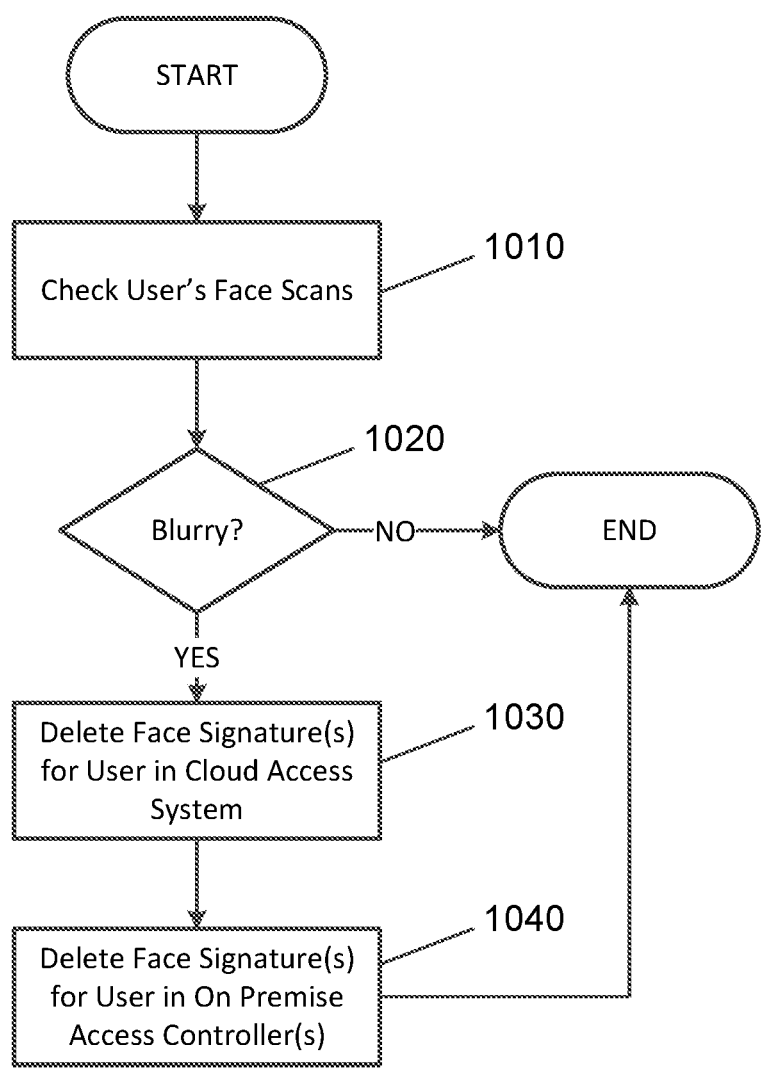

DISTRIBUTED FACIAL RECOGNITION, REGISTRATION, AND AUTHENTICATION

CROSS-REFERENCE TO RELATED APPLICATION(S)

This application claims the benefit of U.S. Provisional Patent Application No. 63/338,054 filed May 4, 2022. The subject matter of this earlier filed application is hereby incorporated by reference in its entirety.

FIELD

The present invention generally pertains to physical access control systems employing facial recognition to authenticate access, and more particularly, to systems and methods for distributed facial recognition, registration, and authentication.

BACKGROUND

Typically, facial recognition-based access control systems act as a standalone terminal where you can register a user, generate a signature for the user's face, and assign that signature to the user's data (e.g., identity and access permissions). Accordingly, when the user returns to the access control system, the access control system captures a new image of the user and compares the new image with the original signature. The typical process allows the access control device to perform facial recognition-based authentication, but only at that particular access control device.

There are drawbacks to this approach. For instance, local and limited registration and/or deregistration requires that each user line up in front of the access control device to capture/remove the original signature, which is operationally inefficient and resource intensive. Also, face signatures are stored locally on the access control device, and thus not available for use in other buildings or access points. Furthermore, the original signature is dependent upon the technical and environmental conditions at the time of imaging, and is therefore fixed by existing imaging technologies, lighting, user appearance, etc. Additionally, legacy face recognition systems may be prone to spoofing attacks, therefore requiring additional layers of manual and/or offline security checks to be performed, counter to the intent of an automated access control system. Moreover, existing systems are not resilient to potential damage or inoperability of the access control system, nor do they provide universal (remote) access to user logs in real time or near-real time to manage user access consistently and continuously. Accordingly, an improved and/or alternative approach may be beneficial.

SUMMARY

Certain embodiments of the present invention may provide solutions to the problems and needs in the art that have not yet been fully identified, appreciated, or solved by current access control technologies, and/or provide a useful alternative thereto. For example, some embodiments of the present invention pertain to a distributed authentication system that includes an access control device (e.g., a local device such as a mobile device or an on premise access controller) and a remote computing system (e.g., a cloud-based server) that can synchronously or asynchronously exchange user signature data, continuously and synchronously learn and adapt to user habits and administrator behaviors, and modify access controls in real time or near real time throughout the entire system.

Certain embodiments can include computer-implemented methods for automatically enrolling, synchronizing, updating, and purging user signature data from the system. Such embodiments may be executed by one or more subsystems that are configured to execute computer program instructions in communication with or in concert with other subsystems within the system. Some embodiments include a computer program product, such as a software application stored in memory, that resides on a user device (e.g., a smartphone, a tablet, etc.) and is configured to securely interface with both the local device and the cloud-based server.

In an embodiment, a system for facial recognition-based access control includes one or more on premise access controllers including a respective camera. The system also includes a cloud access system including one or more remote computing systems configured to maintain signature data between the one or more remote computing systems and the one or more on premise access controllers. The one or more remote computing systems are configured to obtain facial images of an individual at different angles, generate a face signature for the individual using the obtained facial images, and sync the face signature with the one or more on premise access controllers. The one or more on premise access controllers are configured to capture one or more images of a face of the individual, authenticate the individual by comparing the one or more captures facial images to the face signature, automatically permit entry responsive to the authentication of the one or more captured facial images succeeding, and automatically deny entry responsive to the authentication of the one or more captured facial image failing.

In another embodiment, an on premise access controller includes a camera, memory storing computer program instructions, and at least one processor configured to execute the computer program instructions. The computer program instructions are configured to cause the at least one processor to sync face signatures with one or more remote computing systems of an access control system. The computer program instructions are also configured to cause the at least one processor to capture one or more images and 3D depth data of a face of an individual. The computer program instructions are further configured to cause the at least one processor to authenticate the individual by comparing the one or more captures facial images and the 3D depth data to the synced face signatures from the access control system. Additionally, the computer program instructions are configured to cause the at least one processor to automatically permit entry responsive to the authentication of the one or more captured facial images succeeding and automatically deny entry responsive to the authentication of the one or more captured facial image failing. The synced face signatures comprise a complete face scan and photo of the respective individual, a series of photos of the face of the respective individual taken from different angles, orientations, and lighting, a unique numeric signature generated through ML to correspond to each face photo, a 3D mesh of the face of the respective individual, or any combination thereof.

In yet another embodiment, a cloud access system includes one or more remote computing systems configured to maintain signature data between the one or more remote computing systems and one or more on premise access controllers. The cloud access system also includes an ML engine configured to train one or more ML models that perform accurate facial recognition of individuals using photos, perform facial recognition based on 3D depth data, perform facial recognition based on infrared images, perform spoof detection by checking whether an image is of a real person or an artificial source, or any combination thereof. The one or more remote computing systems are configured to obtain facial images of an individual at different angles, generate a face signature for the individual using the obtained facial images via the ML engine, and sync the face signature with the one or more on premise access controllers.

Other features and advantages of embodiments of the present invention are described in detail below.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 10 is a flowchart illustrating a process for removing low quality face signatures, according to an embodiment of the present invention.

Unless otherwise indicated, similar reference characters denote corresponding features consistently throughout the attached drawings.

DETAILED DESCRIPTION OF THE EMBODIMENTS

Embodiments of the present invention enable secure and updated user profile information within a distributed network for facial recognition-based access control systems. In particular, embodiments described herein ensure that a user's face signature (e.g., facial profile data) is routinely and consistently updated across the access control platform. As used herein, a "signature" may be a complete face scan and photo of a person, a series of photos of the person's face taken from different angles, orientations, and lighting, a unique numeric signature generated through machine learning to correspond to each face photo, a three dimensional (3D) mesh or depth data of the person's face taken from a face recognition access control or registration device to perform face recognition or spoofing checks, or any combination thereof.

A remote computing system (e.g., a cloud-based server in a cloud access system) maintains timely and accurate signature data between user devices and access control devices such that each device benefits from the most updated user information, facial recognition models, and spoof detection models. Furthermore, some embodiments allow a user to enroll or disenroll in the access control platform via his or her own mobile device, a cloud-based server, and/or the access control device. The enrollment or disenrollment data may be automatically synchronized and updated throughout the platform, and potentially remotely without having to enroll at a specific enrollment terminal, increasing the convenience and flexibility of the system. Some embodiments also allow users to register their face scans from mobile devices (e.g., smart phones, tablets, etc.) using an application, which stores the face signatures in the cloud, as well as syncs the face signatures with the access control systems in the field, facilitating building and access point entry authentication using facial recognition. These and other benefits of the embodiments may improve the ease with which users and access controllers (e.g., building owners, landlords, etc.) can securely and automatically enroll/disenroll users, thereby improving the uptake and prevalence of facial recognition-based access control platforms. Furthermore, landlords may benefit by avoiding in-person operations for access control management and enrollment, saving them time and allowing them to manage the system remotely from anywhere and across a potentially large number of buildings.

Figure 1:
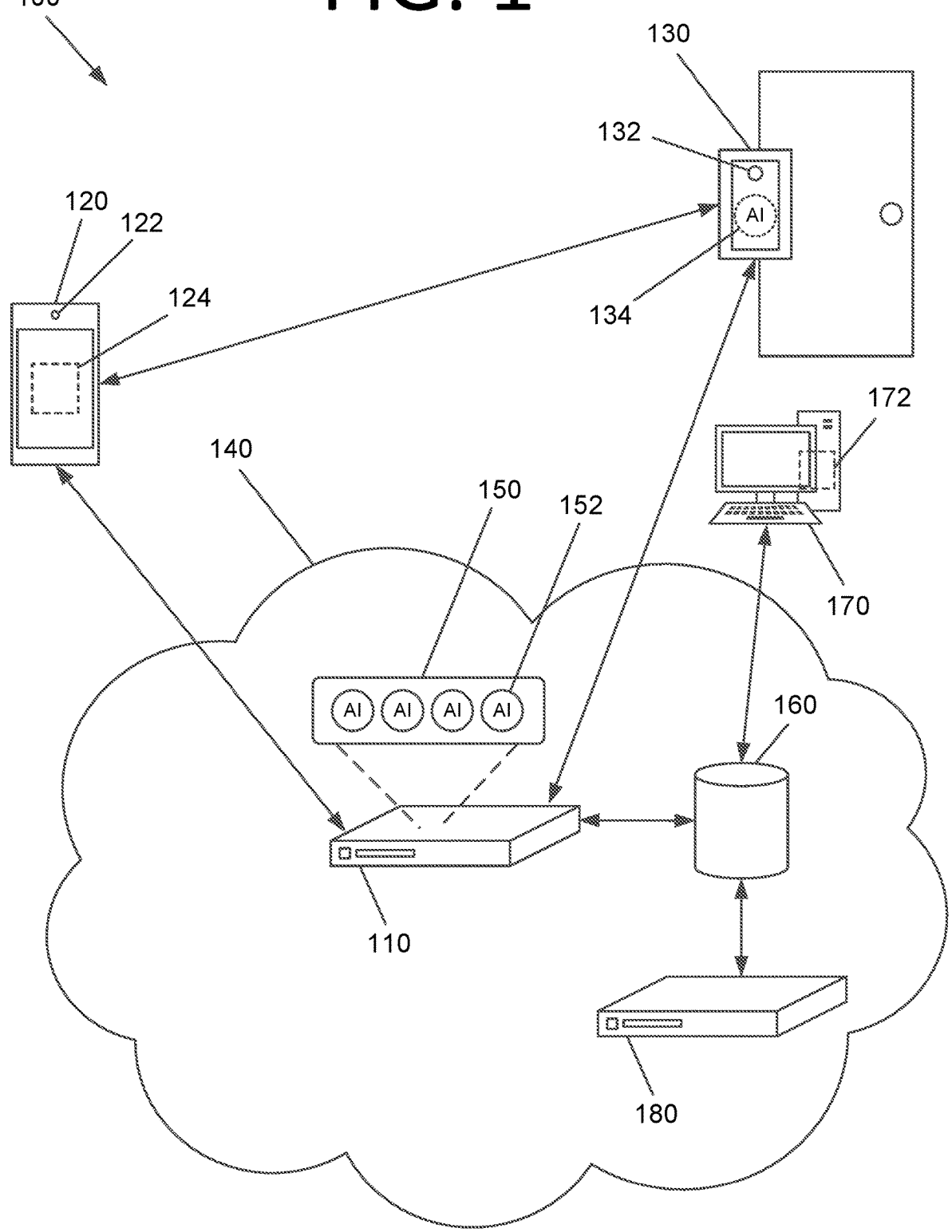
FIG. 1 is a schematic diagram illustrating an architecture of a system for distributed facial recognition, registration, and authentication, according to an embodiment of the present invention.

FIG. 1 is a schematic diagram illustrating an architecture of a system 100 for distributed facial recognition, registration, and authentication, according to an embodiment of the present invention. As shown, system 100 includes a remote computing system 110 (e.g., a server in a cloud access system), a mobile computing device 120, and an access control system 130 (e.g., an on premise access controller) that are in wired and/or wireless communication with one another as described further below. Access control system 130 (e.g., inside a building) may include face recognition access terminals at the door, along with other forms of access readers such as key card and mobile Bluetooth™ or near field communication (NFC) based readers. The readers may be connected to an access control board in a secure side of a building, for example, often inside an electrical room or server room. The access control board can communicate with the readers, as well as cloud application programming interfaces (APIs) for syncing data. Access control system 130 also includes power supply boards, batteries, and Internet connectivity components such as Ethernet switches in some embodiments. Access control system 130 may include cellular connectivity components in some embodiments to maintain cellular-based connectivity to the cloud instead of a hardwired Internet line.

Generally, system 100 enables the real time (synchronous) and backup (asynchronous) exchange of access control information between remote computing system 110 and access control system 130. Access control information to perform facial recognition-based access control is stored and accessible in both remote computing system 110 and access control system 130. Furthermore, the connection between remote computing system 110 and access control system 130 can be continuous or intermittent, and each of remote computing system 110 and access control system 130 can automatically update access control information in real time or asynchronously upon renewed connection. A mobile computing device 120 is also able to communicate with remote computing system 110 and access control system 130.

Mobile computing device 120 and access control system 130 communicate with remote computing system 110 via a network 140 (e.g., a local area network (LAN), a mobile communications network, a satellite communications network, the Internet, any combination thereof, etc.). In some embodiments, remote computing system 110 may be part of a public cloud architecture, a private cloud architecture, a hybrid cloud architecture, etc. In certain embodiments, remote computing system 110 may host multiple software-based servers on a single computing system.

In this embodiment, remote computing system 110 includes a machine learning (ML) engine 150, which is described in more detail below. However, in some embodiments, ML engine 150 may be remote to, and accessed remotely by, remote computing system 110. ML engine 150 includes ML models 152. ML engine 150 has training and retraining components in some embodiments. The types of models that ML engine 150 trains can include, but is not limited to, models that perform accurate facial recognition of a person based on images, models that perform facial recognition based on 3D depth data, models that perform facial recognition based on infrared images, anti-spoofing models used for checking whether the access is being performed by a real person or someone else trying to "spoof" or pretend to a different person (e.g., attempts at gaining entry to the building by holding a photo, print out of a face, or video of another person), etc. The anti-spoofing model may be trained based on images, videos, depth 3D data, infrared, and/or any other suitable information without deviating from the scope of the invention.

ML engine 150 is also responsible for aligning photos of users in some embodiments, e.g., in a preferred or standardized orientation. ML engine 150 may also allow cropping of face data from a larger image or detect motion of a person in a video and their location. ML engine 150 may perform face recognition signature generation, storage, and lookup to compare the person at the door with the database of the faces and signatures. ML engine 150 It can perform lookup between a photo and a large dataset of face photos or signatures in order to accurately identify the person standing at the door and compare the person to those who are already enrolled as registered and authorized users.

In order to train ML models 152, training data (labeled, unlabeled, or both) may be provided by a training data application 172 of a training computing system 170 that can label training data and stored in a database 160. ML models 152 may be initially trained using this training data by one or more servers such as training server 180, for example, and as new training data is available over time, one or more of ML models 152 may be replaced with newly trained ML models or be retrained to increase accuracy. Training server 180 may have a relatively large number of graphical processing units (GPUs) to help train facial recognition and/or spoof detection model(s).

Retraining may be performed in response to detecting data drift and/or model drift in some embodiments. Data drift occurs when the statistical properties of the input data provided to the ML model(s) change over time. Model drift occurs when the ML model(s) themselves become less accurate over time. This may occur due to changes in the relationships between variables, for example, causing the statistical properties of the predictors to change. Data and/or model drift may also occur as the number of people in the system changes over time and the environments where access control is being performed change over time.

Mobile computing device 120 includes a camera 122 and hosts and/or executes an access control application 124. Mobile computing device 120 is also used to provide mobile application-based entry to a building by pressing a button to release the door via access control application 124 in some embodiments. Access control application 124 may also allow a user to enroll photos, 3D scans, and/or infrared scans of their face, which can be synced into the cloud and access control system 130 for the purpose of granting access to the building or wherever access control is being performed. This allows users to use their mobile devices to remotely enroll themselves into the system for facial recognition without having to line up in front of a specific access terminal inside the building, saving time and operational effort.

In some embodiments, users receive an email with an invitation to register, and the user then downloads access control application 124. Once downloaded, the user is able to login to access control application 124 with his or her email via an email based authentication method. After the user is logged in, access control application 124 prompts the user to take various face photos from different angles. This captures the face scan of the user and uploads this data into a cloud access system associated with remote computing system 110. The cloud access system generates and stores face signatures for users.

Access control system 130 includes a camera 132 to capture an image of the user as he or she approaches an entry and automatically permit or prohibit access to the entry in response to verified authentication and permissions granted to the user. In instances in which the user does not have a mobile computing device 120 that includes a camera 122, the user can utilize the camera 132 of the access control system 130 to obtain and upload his or her image to remote computing system 110. Camera 132 can be located at one of the access control readers at any of the access points that are used to grant access to the authorized users in some embodiments. The same access control facial reader can be used to perform enrollment of users in certain embodiments.

In some embodiments, one or more of ML model(s) 152 are deployed locally as ML model(s) 134 on access control system 130. In this manner, if sufficient processing resources are present in access control system 130, ML model(s) 134 can be run locally on access control system 130. This may allow access control system 130 to continue to operate effectively if access control system 130 does not currently have a connection to network 140 for some reason (e.g., the Internet is down).

In some embodiments, remote computing system 110 and/or access control system 130 can ingest the image data from mobile computing device 120 and perform an image quality check to ensure that the image captures enough data to ensure that high quality facial signatures (e.g., access information) are stored and updated in system 100 (e.g., in database 160, remote computing system 110, and/or access control system 130). The criteria used to determine whether the image is of high enough quality may include, but are not limited to, the size of the face in the photo, pitch, yaw, roll, and/or orientation of the person's face, lighting conditions in the room and on the face of the person, the size of the image, the quality of the image in terms of clarity and noise, any combination thereof, etc. Additionally, in the event that an image is of low quality, remote computing system 110 and/or access control system 130 can notify the user via mobile computing device 120 that the image quality is low, and another image should be captured by the user.

In operation, the user's access information (e.g., a face signature) is collected through mobile computing device 120 via camera 122. Mobile computing device 120, via access control application 124, transmits the access information to remote computing system 110, which stores a copy of the access information and/or any ML signatures developed by ML engine 150 in database 160. An ML signature could be a numeric representation or embedded vector of the person's face photo, for example, thus converting the person's photo into a lower dimensional vector or numeric representation. The ML signature is generated by an ML model trained to ensure closer numeric values for the same person's face and more distant numeric values for different people, creating an embedded cluster of numbers.

In some embodiments, ML models 152 may be stored in database 160 instead of on remote computing system 110. Furthermore, remote computing system 110 can transmit a real time notification of the new access information available for the user to access control system 130. In response to the notification, access control system 130 can verify that access control system 130 has the latest access information, and if not, pull the latest access information from remote computing system 110. When the user approaches access control system 130, access control system 130 can capture an image of the user via camera 132 and locally authenticate the user by matching the captured image to the most updated access information received at remote computing system 110. Accordingly, a user can submit his or her access information (e.g., a photo) from mobile computing device 120 at a first location, and the access information can be automatically pushed through remote computing system 110 to access control system 130 at a second location, thereby enabling faster, more accurate, and more convenient enrollment in a face-based access control network of buildings or spaces.

In certain embodiments, remote computing system 110 stores a complete copy of the face recognition access photos and signatures for a set of users that can be pushed to access control system 130 upon initiation or reboot. For example, an access controller may desire to replace access control system 130 or install access control system 130 at an additional building. The access controller can physically install access control system 130 and connect access control system 130 to remote computing system 110. Once access control system 130 comes online, access control system 130 can request a complete copy of the signatures for the authorized/permitted users from remote computing system 110. In response to the request, remote computing system 110 can send a complete copy of the relevant signatures to access control system 130, immediately preparing access control system 130 for handling access requests. In doing so, system 100 eliminates the need for enrolling users at the new, upgraded, or rebooted access control systems as they are already enrolled based on the backup system maintained at remote computing system 110.

In some embodiments, system 100 is configured to be remotely managed and/or reconfigured by the user or the access controller. As noted above, the architecture of system 100 ensures that changes in access or permissions for a user and/or building will be synchronized throughout system 100. Thus, a user can change his or her access data through application 124 on mobile computing device 120, and an access controller can change permissions through a user interface with remote computing system 110 (e.g., a web portal) and/or a user interface of access control system 130. System 100 can then distribute and synchronize changes to access information or permissions throughout remote computing system 110, mobile computing device 120, and/or access control system 130.

In certain embodiments, system 100 can be configured to permit a user to control his or her stored signature, and system 100 can be further configured to ensure that a user's identity and/or signature are deleted from remote computing system 110, mobile computing device 120, and/or access control system 130. For example, if a user decides to have his or her image and access information removed from the system, he or she can delete his or her data from remote computing system 110 via application 124 on mobile computing device 120. Mobile computing device 120 can then transmit the deletion request to remote computing system 110, which, in turn, is configured to gather a complete set of the user's identifiers and creates a list of where the user data is stored, both in online and offline systems. Remote computing system 110 can then purge the user's data from the entirety of system 100 in real time, near-real time, or asynchronously via one or more access control system(s) 130. Following the data purge, the user's information will no longer be available on any computing system of system 100, and therefore, the user will have to re-register or re-enroll with system 100 as described further herein.

In some embodiments, access control system 150 is configured to permit access to a new user who may not be currently registered with access control system 130. For example, if access control system 130 does not detect a local match of the access information from a new user, access control system 130 can be configured to transmit the access information to remote computing system 110. Remote computing system 110 can then either verify the user based upon a match in the access information or deny the user if no matching access information is found. Upon resolution, remote computing system 110 can then transmit an authorization (along with the access information) or a denial to access control system 130.

In certain embodiments, system 100 can be configured to automatically sync access information between remote computing system 110 and access control system 130. For example, in the event that an Internet connection to the on premise controller is interrupted, remote computing system 110 can automatically detect the interruption, note a time of the interruption, note a time at which the connection is restored, and maintain any additional access information that was added or removed during that period. Upon resumption of the connection, remote computing system 110 can then automatically transmit the updated access information to access control system 130.

In some embodiments, system 100 can enable real time or near-real time access information enrollment throughout system 100 through synchronization of remote computing system 110 and access control system 130. For example, a user can enroll him or herself by generating a signature on mobile computing device 120 and uploading the access information to remote computing system 110. Remote computing system 110 can then push the new user data to access control device 130 in real time or near-real time such that the user is authenticated to access control device 130 in a quick and convenient manner.

In certain embodiments, remote computing device 110 can cooperate with ML engine 150 to generate a continuously learning and evolving facial recognition model that increases its accuracy as more and more faces are ingested by system 100. In doing so, the facial recognition model can have reduced dependency on facial features such as sunglasses, skin tone, hats, beards, etc. ML engine 150 can be configured to generate newer checkpoints, benchmarks, or models (e.g., as one of ML models 152) of the facial recognition model in response to a newer model outperforming an older model. The checkpoints and benchmarks may include, but are not limited to, higher accuracy, higher detection, and higher recognition speed, improvement for different user personas such as age, race, gender, etc. In response to an improved model meeting or exceeding a tested performance of a prior model, ML engine 150 can deploy the new facial recognition model on remote computing device 110 and/or access control system 130. In some embodiments, access control system 130 uses the facial recognition model(s) in addition to or in lieu of remote computing system 130. Upon receipt of the new facial recognition model, remote computing system 110 and/or access control system 130 can update any local spoof detection models to the new spoof detection model developed by ML engine 150 (e.g., as part of ML models 152).

In some embodiments, remote computing system 110 can cooperate with ML engine 150 to generate a continuously learning and evolving spoof detection model that increases its accuracy as additional spoofs are ingested and modeled by system 100. The spoof detection model uses machine learning to learn representations of a real person attempting to gain access versus spoofing attack photos of the person by various means, such as a face photo, a face print out, a face video, or a mask of another person up to the camera. The spoof detection model is trained to recognize these differences programmatically and use the differences to assist in making the decision regarding whether to grant access via the access point. In doing so, the spoof detection model can be readily and automatically adapted to detect current and future attempts at spoofing system 100. ML engine 150 can be configured to generate newer checkpoints, benchmarks, or models of the spoof detection model in response to a newer model outperforming an older model. In response to an improved model meeting or exceeding a tested performance of a prior model, ML engine 150 can deploy the new spoof detection model on remote computing system 110 and/or access control system 130. As noted above, upon receipt of the new spoof detection model, remote computing system 110 and/or access control system 130 can update any local models to the new spoof detection model developed by ML engine 150.

In certain embodiments, ML engine 150 can operate on images received from mobile computing device 120 and/or access control system 130. Additionally, system 100 can be configured to transmit all or a portion of images captured by mobile computing device 120 and/or access control system 130 to ML engine 150 for use in improving the facial recognition and/or spoof detection models noted above.

Figure 2:
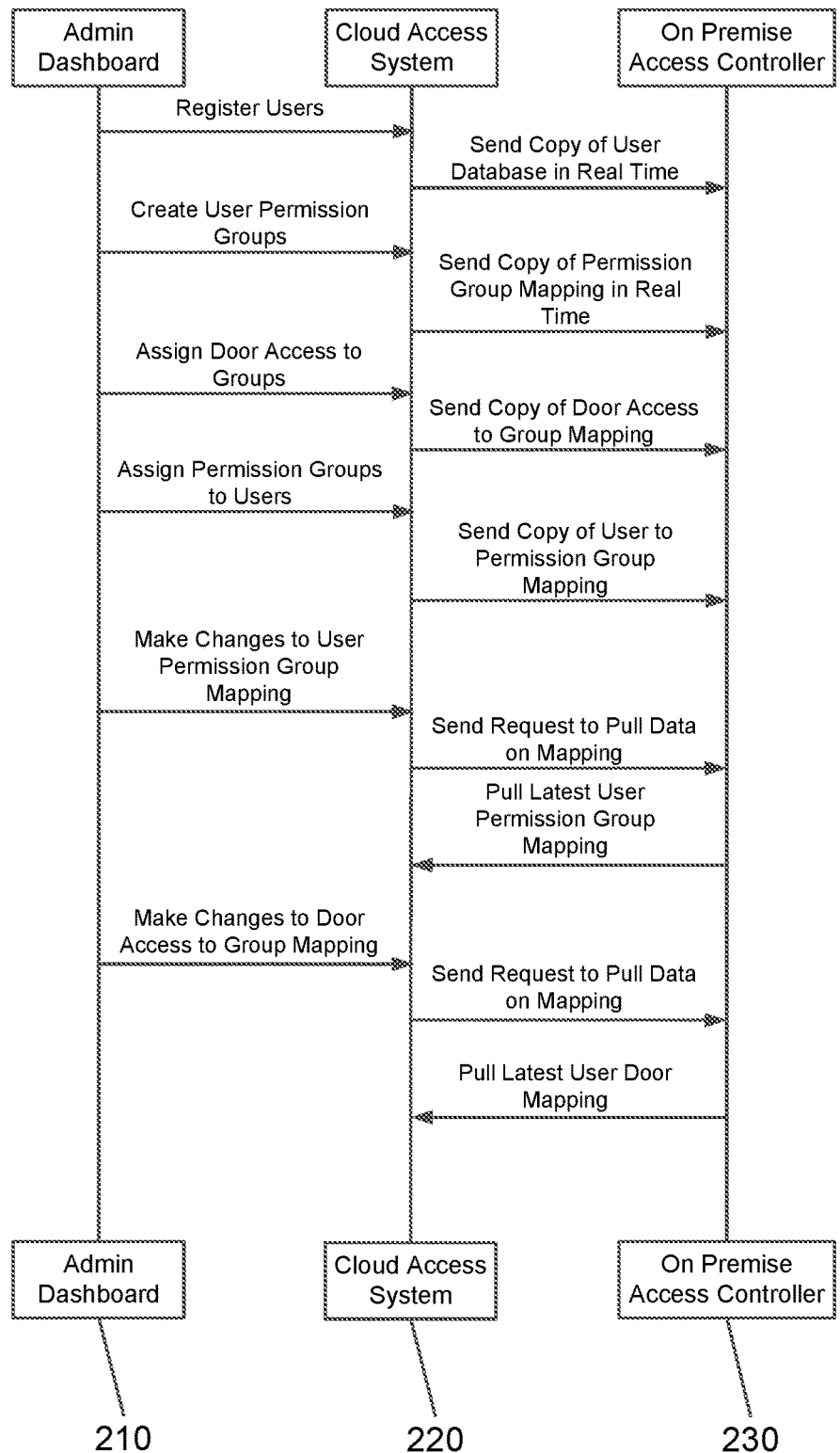
FIG. 2 is a flow diagram illustrating a process for registering users, creating and assigning user permission groups, and assigning door access, according to an embodiment of the present invention.

FIG. 2 is a flow diagram illustrating a process 200 for registering users, creating and assigning user permission groups, and assigning door access, according to an embodiment of the present invention. An admin dashboard 210 is used by an administrator to register users, create user permission groups, assign door access to user permission groups, and assign user permission groups to users in a cloud access system 220. Copies of the user database, user permission group mapping, door access to user group mapping, and user to permission group mapping are sent to an on premise access controller 230 in real time. Thus, copies of this information persist on both cloud access system 220 and on premise access controller 230.

Admin dashboard 210 may be a web-based, cloud-based dashboard that administrators can log into and manage access to buildings or other locations for various users. Administrators can invite users via email to enroll themselves into the access system(s) for building(s) or other locations. For each user, the administrator may select the doors that the user can gain access to via facial recognition. Limited time windows may also be tied to user access in some embodiments. The administrator can add users into these groups, which automatically grants the user permissions to the related set of doors.

The administrator, via admin dashboard 210, is also able to subsequently make changes to the mappings. For instance, if the administrator makes changes to the user permission group mapping and the door access to user group mapping. In both instances, cloud access system 220 sends requests to on premise access controller 230 to pull the latest mappings from cloud access system 220. On premise access controller 230 then does so in real time, ensuring that both cloud access system 220 and on premise access controller 230 have the latest mappings.

Figure 3:
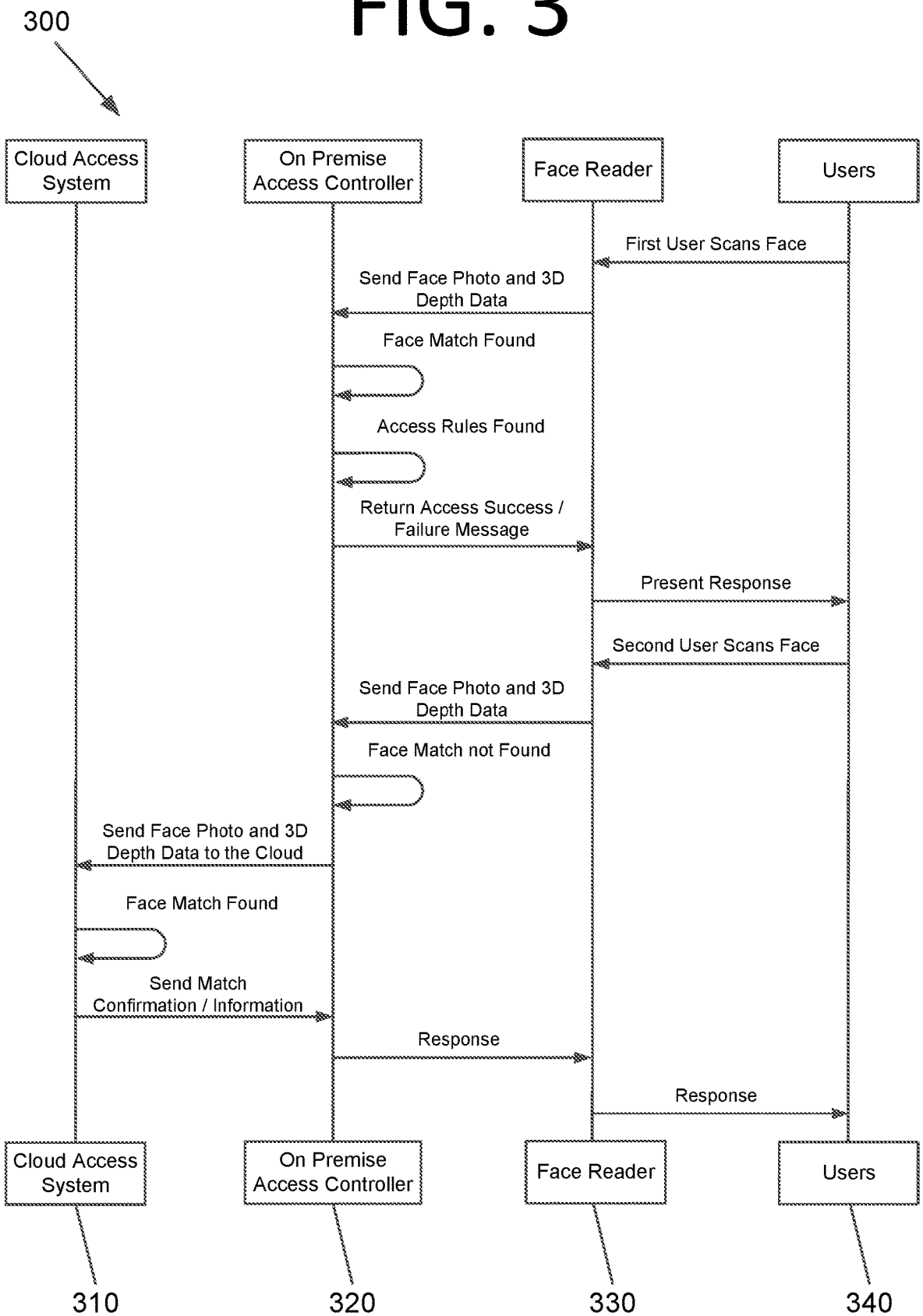
FIG. 3 is a flow diagram illustrating a process for performing facial recognition, according to an embodiment of the present invention.

FIG. 3 is a flow diagram illustrating a process 300 for performing facial recognition, according to an embodiment of the present invention. Users 340 present their faces to a face reader 330. FIG. 3 covers two scenarios for two different users. When the first user scans his or her face, the face photo and 3D depth data are sent to an on premise access controller 320. On premise access controller 320 checks for a face match and access rules permitting access for that user at the location of face reader 330. An access success/failure message is then sent from on premise access controller 320 to face reader 330, and the user is presented with the response by face reader 330.

In the second scenario, the second user scans his or her face via face reader 330 and the face photo and 3D depth data are sent to an on premise access controller 320. However, in this case, on premise access controller 320 does not find a match. On premise access controller 320 then sends the face photo and 3D depth data to cloud access system 310, which detects a face match and sends the match confirmation and information for that user to make the match to on premise access controller 320. Face reader 330 is then informed that access is permitted for the user, and face reader 330 informs the user accordingly.

Figure 4:
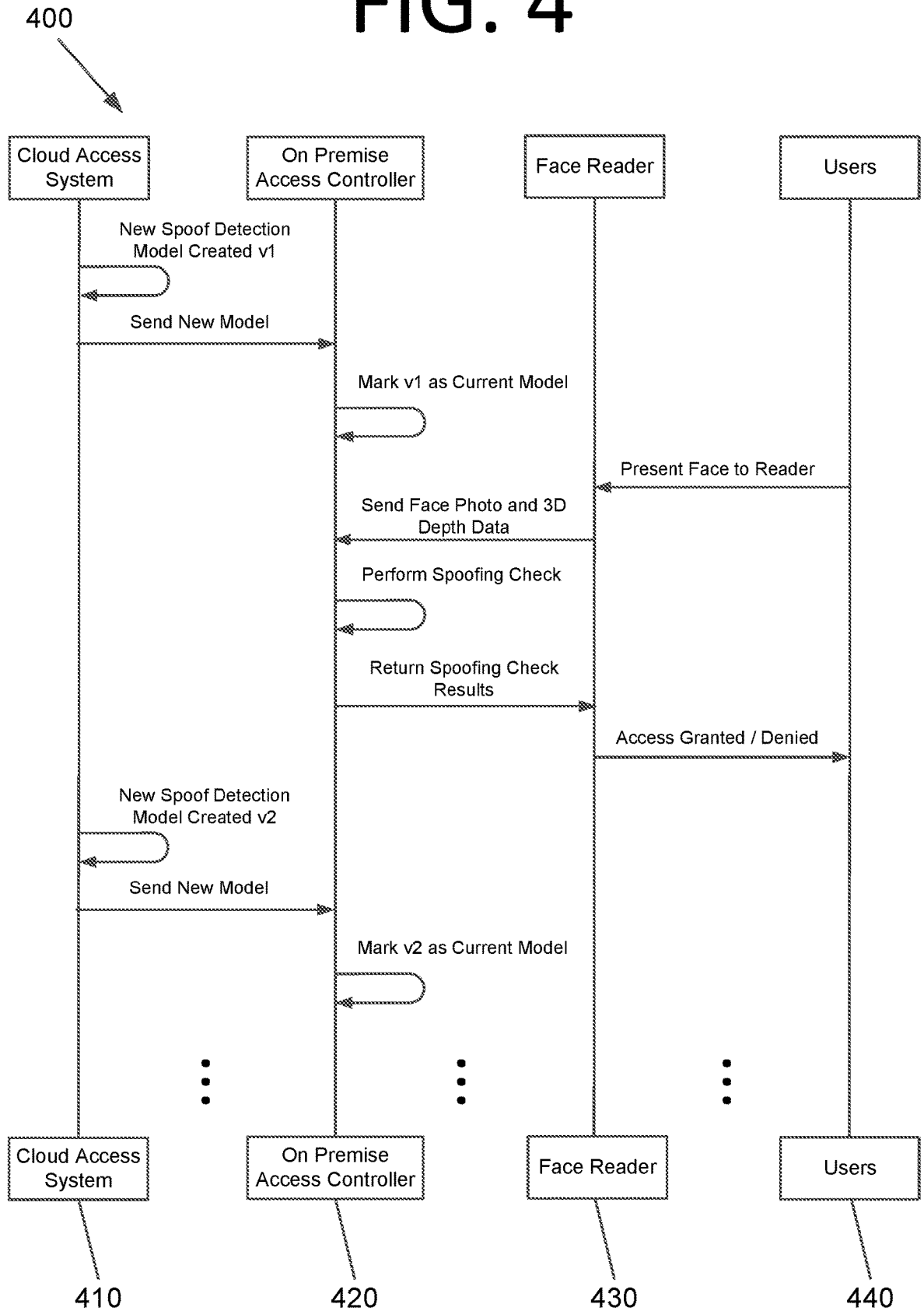
FIG. 4 is a flow diagram illustrating a process for performing spoof detection, according to an embodiment of the present invention.

FIG. 4 is a flow diagram illustrating a process 400 for performing spoof detection, according to an embodiment of the present invention. A cloud access system 410 creates a new spoof detection model (v1) and sends this model to an on premise access controller 420. In some embodiments, cloud access system 410 may notify on premise access controller 420 of the new model, and on premise access controller 420 may then pull the model from cloud access system 410. On premise access controller 420 then marks the new model as the current spoof detection model.

A user 440 presents his or her face to face reader 430, which sends face photo and 3D depth data to on premise access controller 420. On premise access controller 420 performs spoof detection and returns the results to face reader 430, which informs user 440 whether access was granted or denied. Cloud access system 410 then creates another new spoof detection model (v2) and sends this model to on premise access controller 420. On premise access controller 420 then marks the new model as the current spoof detection model.

Figure 5:
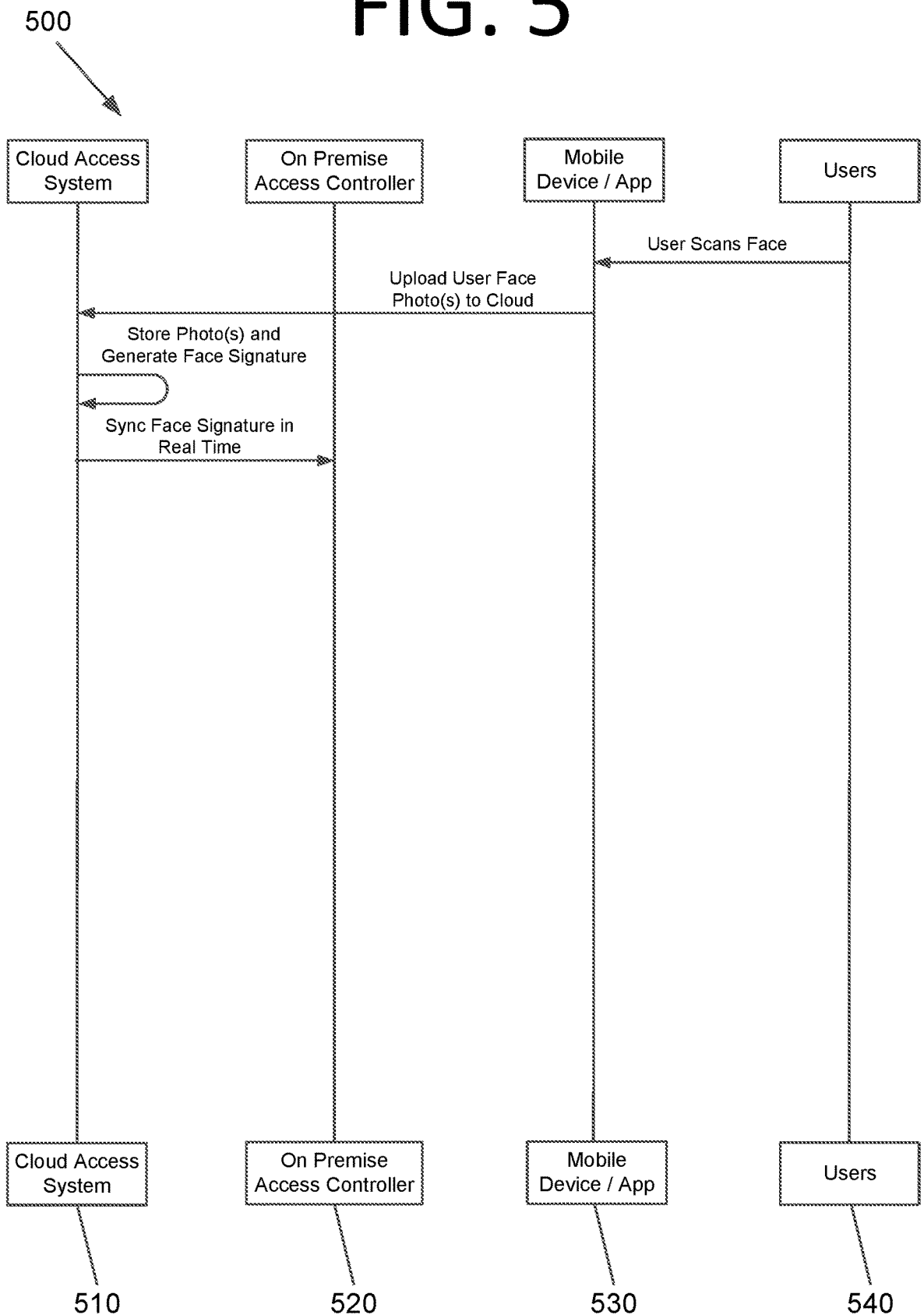
FIG. 5 is a flow diagram illustrating a process for uploading facial photos and generating and syncing facial signatures, according to an embodiment of the present invention.

FIG. 5 is a flow diagram illustrating a process 500 for uploading facial photos and generating and syncing facial signatures, according to an embodiment of the present invention. A user 540 scans his or her face via an access control application on a mobile device 530. The access control application and mobile device 530 then upload user face photo(s) to cloud access system 510. Cloud access system 510 stores the photo(s) and uses them to generate a face signature for user 540. Cloud access system 510 then syncs the face signature with one premise controller 520. In some embodiments, the user may then attempt to perform door access using the process of FIG. 3, for example.

It should be noted that components of FIGS. 2-5 having the same names may be the same in some embodiments. For instance, cloud access system 220, 310, 410, 510, on premise access controller 230, 320, 420, 520, and/or face reader 330, 430, 530 may be the same in some embodiments.

As used herein, a "cloud access system" is an access control configuration system that stores information related to access control systems in a remote cloud-based server system, redundantly storing information across a distributed set of machines and eliminating dependence on storing information on a single computer in the building. An "on premise access controller" is a computing system associated with a location where access control is being performed (e.g., running inside a building where access control is required). The on premise access controller is able to communicate with the cloud access system, as well as with local face readers in the building. The on premise access controller can store local information pertaining to access control rules in the building. A face reader is an access control device capable of scanning a user's face and includes a sensor for capturing facial images for facial recognition purposes. An "access control application" on a user's mobile device is a mobile application that allows the user to perform face photo enrollment.

Figure 6A:
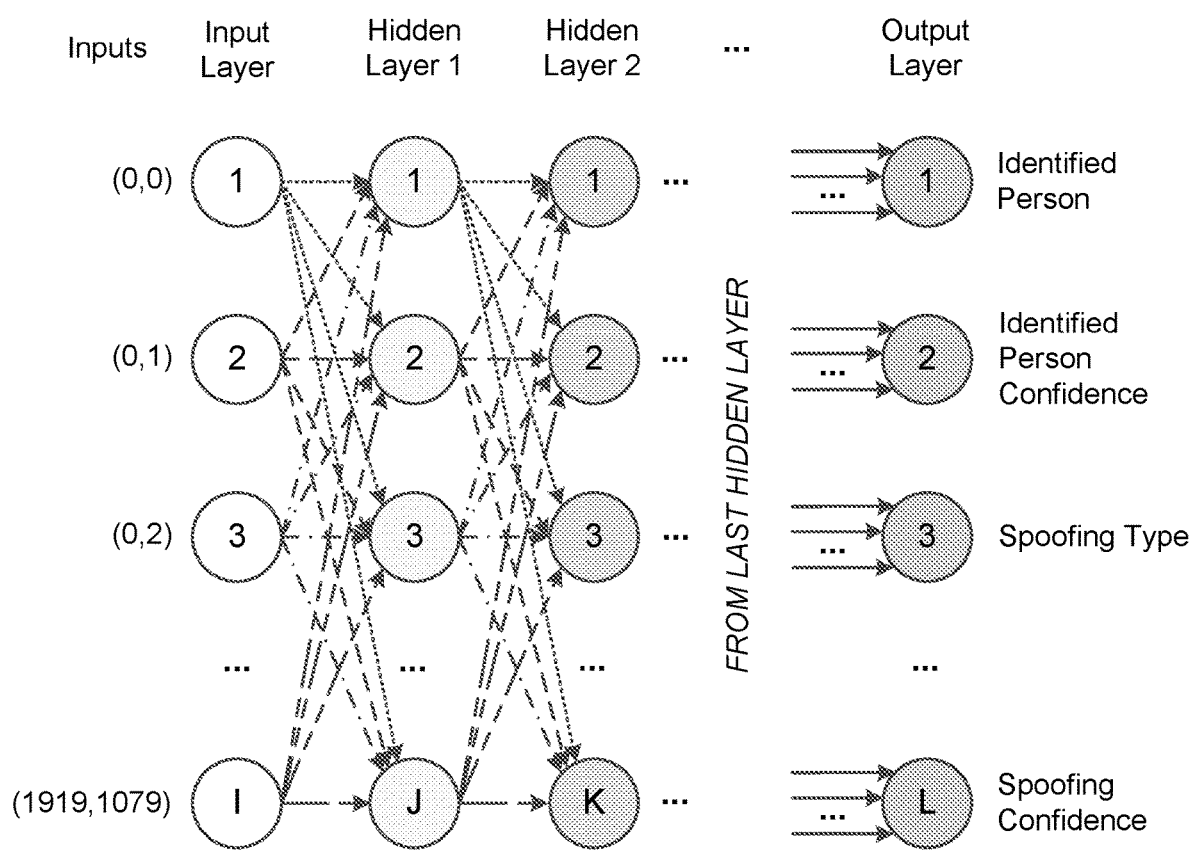
FIG. 6A illustrates a neural network that has been trained to perform facial recognition and/or spoof detection, according to an embodiment of the present invention.

Per the above, ML may be used for facial recognition and/or spoof detection. Various types of ML models may be trained and deployed without deviating from the scope of the invention. For instance, FIG. 6A illustrates an example of a neural network 600 that has been trained to perform facial recognition and/or spoof detection, according to an embodiment of the present invention. Neural network 600 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. While multiple suggestions are shown here as output, in some embodiments, only a single output suggestion is provided. In certain embodiments, the suggestions are ranked based on confidence scores.

It should be noted that numbers of neurons I, J, K, and L are not necessarily equal. Thus, any desired number of layers may be used for a given layer of neural network 600 without deviating from the scope of the invention. Indeed, in certain embodiments, the types of neurons in a given layer may not all be the same.

Neural network 600 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the ML model based on how often a similar input was correctly identified during training. Some common types of confidence scores include a decimal number between 0 and 1 (which can be interpreted as a confidence percentage as well), a number between negative $\infty$ and positive $\infty$, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
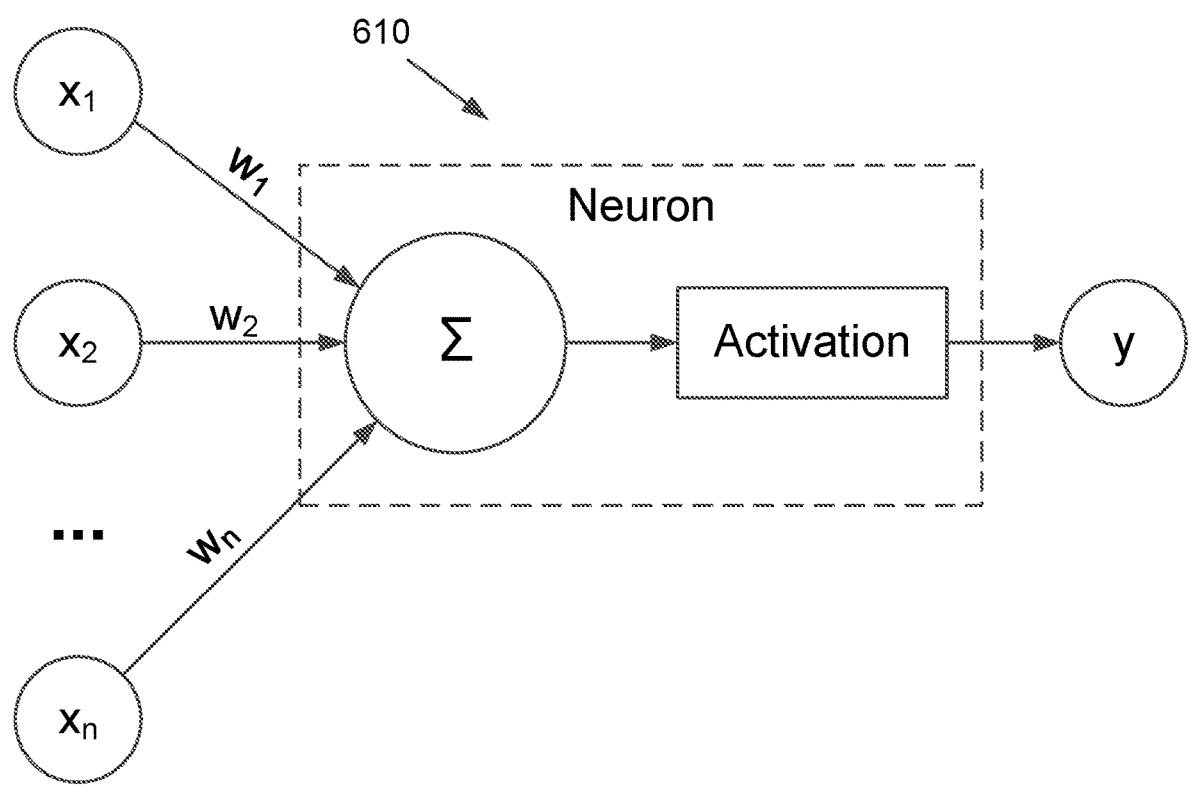
FIG. 6B illustrates an example of a neuron, according to an embodiment of the present invention.

An example of a neuron 610 is shown in FIG. 6B. Inputs $x_1, x_2, \ldots, x_n$, from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m} (w_i x_i) + \text{bias} \quad (1)$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \quad (2)$$

The output y of neuron 610 may thus be given by:

$$y = f(x) \sum_{i=1}^{m} (w_i x_i) + \text{bias} \quad (3)$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 600. Successful identifications strengthen weights for inputs to neurons, whereas unsuccessful identifications weaken them. A cost function, such as mean square error (MSE) or gradient descent, may be used to punish predictions that are slightly wrong much less than predictions that are very wrong. If the performance of the ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer $i=1, \ldots, N$ of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \quad (4)$$

In some embodiments, o is compared with a target output t, resulting in an error $$E = \frac{1}{2} \|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j) = f'_j(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where ∘ denotes a Hadamard product (i.e., the element-wise product of two vectors), T denotes the matrix transpose, and $o_j$ denotes $f_j(W_j o_{j-1} + b_j)$, with $o_0 = x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the ML model may be tested on a set of evaluation data that the ML model has not encountered before. This helps to ensure that the ML model is not "over fit" such that it performs well on the training data, but does not perform well on other data.

In some embodiments, it may not be known what accuracy level is possible for the ML model to achieve. Accordingly, if the accuracy of the ML model is starting to drop when analyzing the evaluation data (i.e., the model is performing well on the training data, but is starting to perform less well on the evaluation data), the ML model may go through more epochs of training on the training data (and/or new training data). In some embodiments, the ML model is only deployed if the accuracy reaches a certain level or if the accuracy of the trained ML model is superior to an existing deployed ML model. In certain embodiments, a collection of trained ML models may be used to accomplish a task. For instance, facial recognition models may be trained for different ethnicities or other characteristics and employed serially, in parallel, or collectively in a voting system where the most common prediction is selected for facial recognition. Multiple ML models may also be employed to detect different types of spoofing.

In some embodiments, clustering algorithms may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 7:
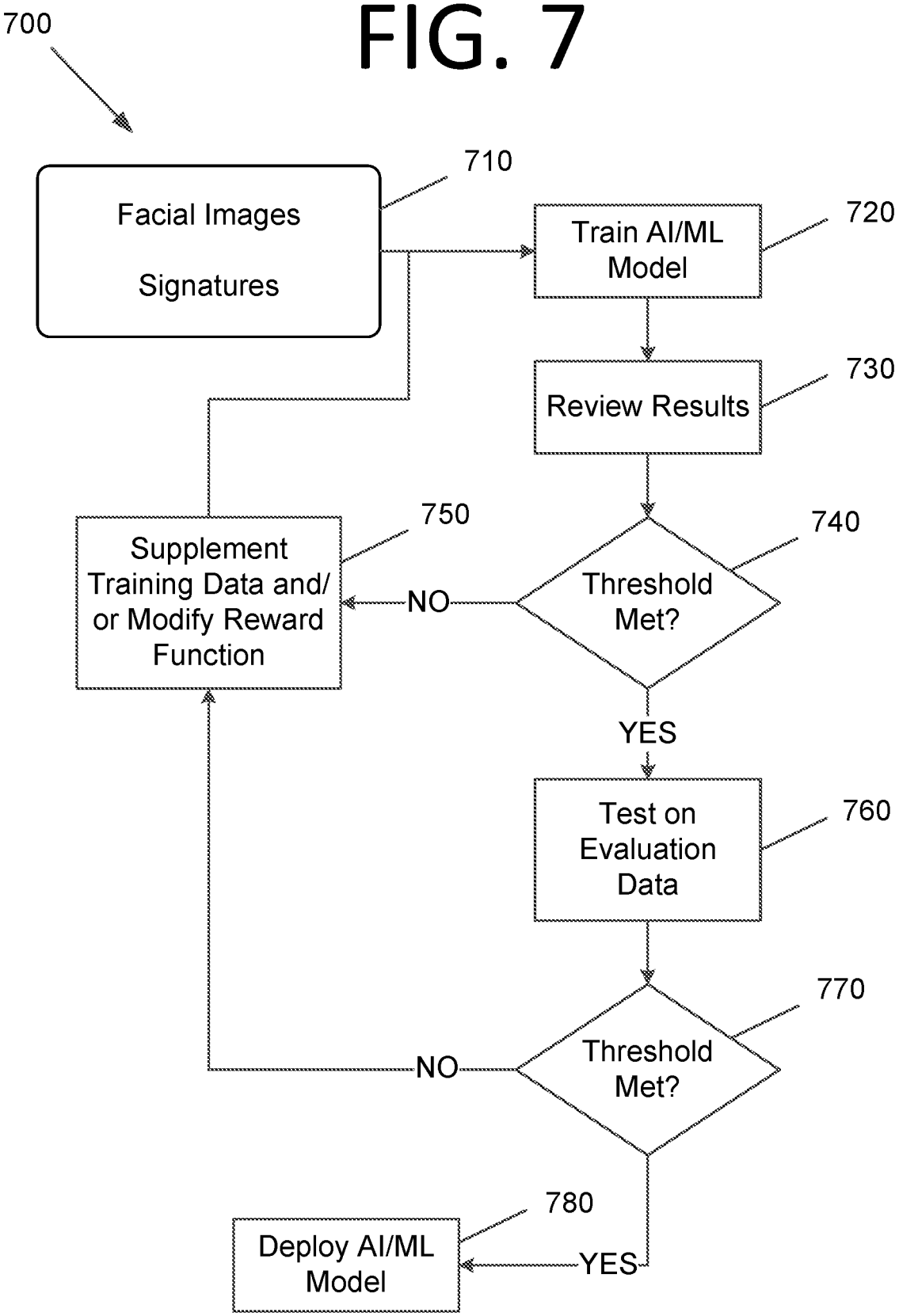
FIG. 7 is a flowchart illustrating a process for training machine learning (ML) model(s), according to an embodiment of the present invention.

FIG. 7 is a flowchart illustrating a process 700 for training ML model(s), according to an embodiment of the present invention. The training process begins with providing facial images and signatures, whether labeled or unlabeled, at 710 to enable the ML model to learn to perform facial recognition. The ML model is then trained over multiple epochs at 720 and results are reviewed at 730.

If the ML model fails to meet a desired confidence threshold at 740, the training data is supplemented and/or the reward function is modified to help the ML model achieve its objectives better at 750 and the process returns to step 720. If the ML model meets the confidence threshold at 740, the ML model is tested on evaluation data at 760 to ensure that the ML model generalizes well and that the ML model is not over fit with respect to the training data. The evaluation data includes information that the ML model has not processed before. If the confidence threshold is met at 770 for the evaluation data, the ML model is deployed at 780. If not, the process returns to step 750 and the ML model is trained further.

Figure 8:
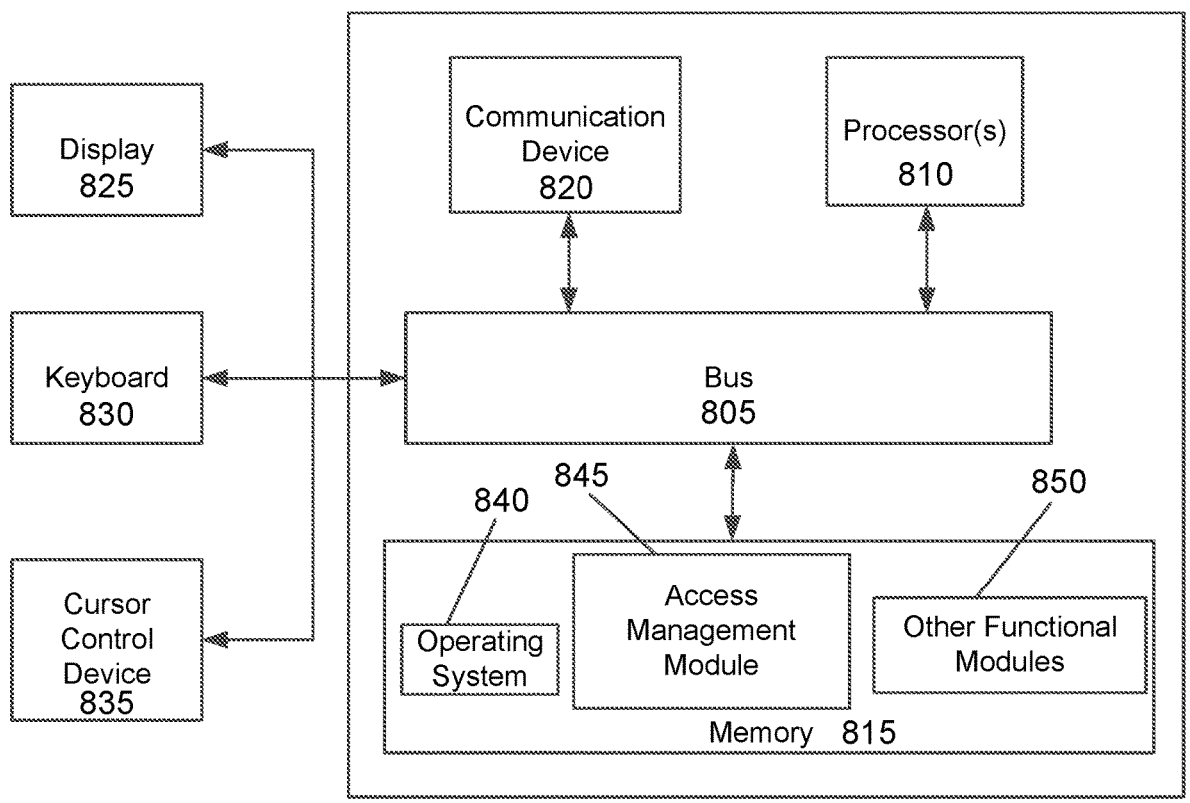
FIG. 8 is a schematic block diagram illustrating a computing system configured to perform distributed face recognition, registration, and authentication, or aspects thereof, according to an embodiment of the invention.

FIG. 8 is a schematic block diagram illustrating a computing system 800 configured to perform distributed face recognition, registration, and authentication, or aspects thereof, according to an embodiment of the invention. In some embodiments, computing system 800 may be remote computing system 110, mobile computing device 120, or access control system 130 of FIG. 1 (also referred to as "subsystems"), for example. These subsystems may be configured to cooperatively register, maintain, synchronize, and improve access information associated with a user in facial recognition-based access control system 100 as described herein, as well as described with respect to FIGS. 2-5, 9, and 10.

Computing system 800 includes a bus 805 or other communication mechanism for communicating information, and processor(s) 810 coupled to bus 805 for processing information. Processor(s) 810 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 810 may also have multiple processing cores, and at least some of the cores may be configured to perform specific functions. Multi-parallel processing may be used in some embodiments. In certain embodiments, at least one of processor(s) 810 may be a neuromorphic circuit that includes processing elements that mimic biological neurons. In some embodiments, neuromorphic circuits may not require the typical components of a Von Neumann computing architecture.

Computing system 800 further includes a memory 815 for storing information and instructions to be executed by processor(s) 810. Memory 815 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 810 and may include volatile media, non-volatile media, or both. The media may also be removable, non-removable, or both.

Additionally, computing system 800 includes a communication device 820, such as a transceiver, to provide access to a communications network via a wireless and/or wired connection. In some embodiments, communication device 820 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 820 may include one or more antennas that are singular, arrayed, phased, switched, beamforming, beamsteering, a combination thereof, and or any other antenna configuration without deviating from the scope of the invention.

Processor(s) 810 are further coupled via bus 805 to a display 825, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 825 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 830 and a cursor control device 835, such as a computer mouse, a touchpad, etc., are further coupled to bus 805 to enable a user to interface with computing system 800. However, in certain embodiments, a physical keyboard and mouse may not be present, and the user may interact with the device solely through display 825 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 815 stores software modules that provide functionality when executed by processor(s) 810. The modules include an operating system 840 for computing system 800. The modules further include an access management module 845 that is configured to perform all or part of the processes described herein or derivatives thereof. Computing system 800 may include one or more additional functional modules 850 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 9:
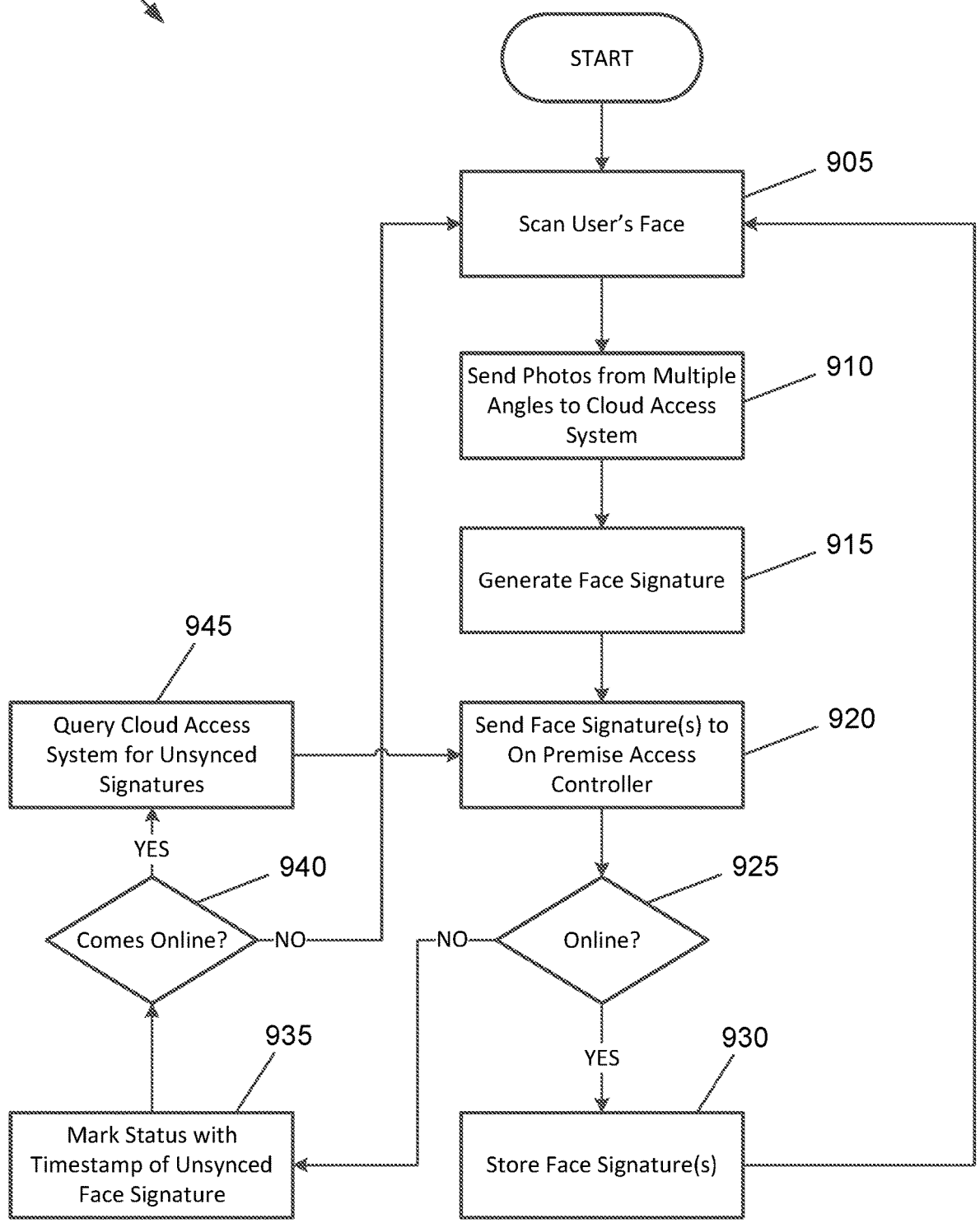
FIG. 9 is a flowchart illustrating a process for generating and processing facial signatures, according to an embodiment of the present invention.

FIG. 9 is a flowchart illustrating a process 900 for generating and processing facial signatures, according to an embodiment of the present invention. The process begins with a user scanning his or her face using an access control application on a mobile device at 905. Photos of the user's face are captured from multiple angles via the access control application and mobile device, and the photos are sent to a cloud access system at 910. The cloud access system generates a face signature using the photos at 915 and sends the face signature to an on premise access controller at 920. If the on premise access controller is online at 925, it stores the face signature at 930.

However, if the on premise access controller is not online at 925, the clous access system marks the status of the face signature with a timestamp at 935 so the face signature can be tracked for syncing later. If the on premise access controller later comes online at 940, the on premise access controller queries the cloud access system for unsynced signatures using the timestamp(s), and the process returns to step 920.

FIG. 10 is a flowchart illustrating a process 1000 for removing low quality face signatures, according to an embodiment of the present invention. The process begins with an administrator, via an admin dashboard, checking face scans for a user at 1010. If the face scans are blurry at 1020, the administrator, via the admin dashboard, deletes the face signatures for the user from the cloud access system at 1030. The cloud access system then, in real time, causes the on premise access controller(s) that have copies of the user's face signatures to delete these copies at 1040.

The process steps performed in FIGS. 2-5, 9, and 10 may be performed by computer program(s), encoding instructions for the processor(s) to perform at least part of the process(es) described in FIGS. 2-5, 9, and 10, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 810 of computing system 800 of FIG. 8 to implement all or part of the process steps described in FIGS. 2-5, 9, and 10, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for facial recognition-based access control, comprising:
one or more on premise access controllers comprising a respective camera;
a cloud access system comprising one or more remote computing systems configured to maintain signature data between the one or more remote computing systems and the one or more on premise access controllers; and
a machine learning (ML) engine, wherein
the one or more remote computing systems are configured to:
obtain facial images of an individual at different angles,
generate a face signature for the individual using the obtained facial images, and
sync the face signature with the one or more on premise access controllers,
the one or more on premise access controllers are configured to:
capture one or more images of a face of the individual,
authenticate the individual by comparing the one or more captures facial images to the face signature,
automatically permit entry responsive to the authentication of the one or more captured facial images succeeding, and
automatically deny entry responsive to the authentication of the one or more captured facial image failing, and
the ML engine is configured to perform at least one of:
(a) aligning the one or more captured images of the face of the individual, and
(b) cropping the one or more captured images and performing face recognition signature generation, storage, and lookup to compare the individual with a database of face signatures.

2. The system of claim 1, wherein the face signature comprises a complete face scan and photo of the individual, a series of photos of the face of the individual taken from different angles, orientations, and lighting, a unique numeric signature generated through machine learning (ML) to correspond to each face photo, a three dimensional (3D) mesh or depth data of the face of the individual, or any combination thereof.

3. The system of claim 1, wherein the one or more on premise access controllers comprise one or more machine learning (ML) models, and
the one or more on premise access controllers are configured to use the one or more ML models configured to perform facial recognition, spoof detection, or both, during the authentication of the individual.

4. The system of claim 1, wherein the one or more on premise access controllers are further configured to capture three dimensional (3D) depth data in addition to the one or more captured images of the face of the individual.

5. The system of claim 1, wherein responsive to an access controller of the one or more on premise access controllers failing to identify the user, the respective on premise access controller is configured to send the captured one or more images of the face of the individual to the one or more remote computing systems, and
the one or more remote computing systems are configured to authenticate the individual by comparing the one or more captures facial images to the face signature and provide results of the authentication to the respective on premise access controller.

6. The system of claim 1, wherein responsive to detecting that an on premise access controller of the one or more on premise access controllers is offline while when trying the sync the face signature with the respective on premise access controller, the one or more remote computing systems are configured to generate a timestamp for the face signature, and upon coming online, the respective on premise access controller is configured to query the one or more remote computing systems for unsynced signatures, and the one or more remote computing systems are configured to compare the timestamp to a time that the respective on premise access controller came online again and provide the face signature to the respective on premise access controller.

7. The system of claim 1, wherein upon bringing an on premise access controller of the one or more on premise access controllers online, the respective on premise access controller is configured to obtain copies of face signatures for users that are stored in the cloud access system.

8. The system of claim 1, further comprising:
an admin dashboard configured to:
register users, create user permission groups, assign door access to user permission groups, and assign user permission groups to users in the cloud access system, and
send copies of registered users, mappings of user permission groups, mappings of door access to user groups, and mappings of user to permission groups to the one or more on premise access controllers in real time.

9. The system of claim 1, wherein the cloud access system further comprises:
a machine learning (ML) engine is configured to train one or more ML models that perform accurate facial recognition of individuals using photos, perform facial recognition based on three dimensional (3D) depth data, perform facial recognition based on infrared images, perform spoof detection by checking whether an image is of a real person or an artificial source, or any combination thereof.

10. The system of claim 9, wherein the ML engine is configured to use newly captured facial image data, spoofed image data, or both, to train a new version of a facial recognition model and/or a spoof detection model, and responsive to when an accuracy of the new version of the facial recognition model or the spoof detection model exceeding exceeds an accuracy of a currently deployed facial recognition model or the spoof detection model,
the ML engine is configured to deploy the new version of the facial recognition model or the spoof detection model to the one or more on premise access controllers.

11. The system of claim 1, further comprising:
a mobile computing device comprising a camera and an access control application, wherein the access control application is configured to capture the one or more facial images of the individual obtained by the one or more remote computing systems and upload the one or more images to the cloud access system.

12. The system of claim 11, wherein the one or more remote computing systems are configured to:
perform an image quality check to ensure that the one or more obtained images meet minimum quality criteria, the minimum quality criteria comprising a size of the face, pitch, yaw, roll, and/or orientation of the face, lighting conditions, image size, image quality in terms of clarity and noise, any combination thereof, in the one or more captured images, and
responsive to the obtained image not meeting the minimum quality criteria, notify the access control application of the mobile computing device that the one or more obtained images do not meet the minimum quality criteria.

13. An on premise access controller, comprising:
a camera; memory storing computer program instructions; and
at least one processor configured to execute the computer program instructions, wherein the computer program instructions are configured to cause the at least one processor to:
sync face signatures with one or more remote computing systems of an access control system,
capture one or more images and three dimensional (3D) depth data of a face of an individual,
perform at least one of: (a) aligning the one or more captured images of the face of the individual; and (b) cropping the one or more captured images and performing face recognition signature generation, storage, and lookup to compare the individual with a database of face signatures,
authenticate the individual by comparing the one or more captures facial images and the 3D depth data to the synced face signatures from the access control system,
automatically permit entry responsive to the authentication of the one or more captured facial images succeeding, and
automatically deny entry responsive to the authentication of the one or more captured facial image failing, wherein the synced face signatures comprise a complete face scan and photo of the respective individual, a series of photos of the face of the respective individual taken from different angles, orientations, and lighting, a unique numeric signature generated through machine learning (ML) to correspond to each face photo, a 3D mesh of the face of the respective individual, or any combination thereof.

14. The on premise access controller of claim 13, wherein responsive to failing to identify the user, the on premise access controller is configured to:
send the captured one or more images and the 3D depth data of the face of the individual to the one or more remote computing systems; and receive results of authentication by the one or more remote computing systems.

15. The on premise access controller of claim 13, wherein after when the on premise access controller has been offline, upon coming online, the on premise access controller is configured to:
query the one or more remote computing systems for unsynced signatures;
received the unsynced face signatures from the one or more remote computing systems; and
store the one or more unsynced face signatures.

16. A cloud access system, comprising: one or more remote computing systems configured to maintain signature data between the one or more remote computing systems and one or more on premise access controllers; and
a machine learning (ML) engine configured to train one or more ML models that perform accurate facial recognition of individuals using photos, perform facial recognition based on three dimensional (3D) depth data, perform facial recognition based on infrared images, perform spoof detection by checking whether an image is of a real person or an artificial source, or any combination thereof, wherein the one or more remote computing systems are configured to:

obtain facial images of an individual at different angles, generate a face signature for the individual using the obtained facial images via the ML engine, and sync the face signature with the one or more on premise access controllers, and the ML engine is configured to perform at least one of:
    (a) aligning the one or more captured images of the face of the individual, and
    (b) cropping the one or more captured images and performing face recognition signature generation, storage, and lookup to compare the individual with a database of face signatures.

17. The cloud access system of claim 16, wherein the ML engine is configured to use newly captured facial image data, spoofed image data, or both, to train a new version of a facial recognition model and/or a spoof detection model, and responsive to when an accuracy of the new version of the facial recognition model or the spoof detection model exceeding exceeds an accuracy of a currently deployed facial recognition model or the spoof detection model, the ML engine is configured to deploy the new version of the facial recognition model or the spoof detection model to the one or more on premise access controllers.

18. The cloud access system of claim 16, responsive to detecting that an on premise access controller of the one or more on premise access controllers is offline while when trying the sync the face signature with the respective on premise access controller, the one or more remote computing systems are configured to: generate a timestamp for the face signature; and responsive to a query for unsynced signatures from the respective on premise access controller, compare the timestamp to a time that the respective on premise access controller came online again and provide the face signature to the respective on premise access controller.

\* \* \* \* \*